(12) United States Patent
Rathod et al.

(10) Patent No.: US 12,481,195 B2
(45) Date of Patent: Nov. 25, 2025

(54) STRUCTURE WITH COLOR-CHANGING HOUSING

(71) Applicant: MILWAUKEE ELECTRIC TOOL CORPORATION, Brookfield, WI (US)

(72) Inventors: Swapnil Suresh Rathod, Milwaukee, WI (US); Kyle C. Fassbender, Brookfield, WI (US); Matthew R. Polakowski, Greenfield, WI (US); James P. Elfering, Antioch, IL (US); Michael A. Barrowclift, East Troy, WI (US); Maria Krutikova, Wauwatosa, WI (US); Max Karbin, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 957 days.

(21) Appl. No.: 17/497,424

(22) Filed: Oct. 8, 2021

(65) Prior Publication Data

US 2022/0113605 A1 Apr. 14, 2022

Related U.S. Application Data

(60) Provisional application No. 63/089,743, filed on Oct. 9, 2020.

(51) Int. Cl.
 *G02F 1/1685* (2019.01)
(52) U.S. Cl.
 CPC .................. *G02F 1/1685* (2019.01)
(58) Field of Classification Search
 CPC .... G02F 3/00; G02F 2202/00; G02F 2203/00; G02F 1/1685; G02F 1/00; G02F 1/01;
 (Continued)

(56) References Cited

U.S. PATENT DOCUMENTS 5,059,895 A 10/1991 Cataldi et al.
7,691,525 B2 4/2010 Um
(Continued)

FOREIGN PATENT DOCUMENTS

CN 101645522 A 2/2010
CN 201789049 U 4/2011
(Continued)

OTHER PUBLICATIONS

Atlanta Chemical Engineering, "Thermochromic Paints," <https://www.atlantachemical.com/tpt/tpt.html#/tpt> web page visited Oct. 14, 2021.
(Continued)

*Primary Examiner* — Brandi N Thomas
(74) *Attorney, Agent, or Firm* — Michael Best & Friedrich LLP (57) ABSTRACT

An electrical device capable of emitting or absorbs energy relative a surrounding environment. The electrical device includes a housing, an interior volume defined in the housing, an energy sensor at least partially exposed to the surrounding environment, a first material having a first absorptivity, and a second material having a second absorptivity lower than the first absorptivity. The first material is nearer to the surrounding environment than the second material is at an energy sensor reading below a threshold energy range, and the first material is farther from the surrounding environment than the second material is at an energy sensor reading above the threshold energy range.

16 Claims, 8 Drawing Sheets

(58) Field of Classification Search
CPC ........ G02F 1/0126; G02F 1/0121; G02F 1/13; G02F 1/15
See application file for complete search history.

(56) References Cited

U.S. PATENT DOCUMENTS

| | | | |
|---|---|---|---|
| 8,986,866 B2* | 3/2015 | Lynch | G08B 29/181 429/61 |
| 2009/0236109 A1* | 9/2009 | Wu | B25F 5/02 374/E1.002 |
| 2011/0026098 A1 | 2/2011 | Komatsu | |
| 2014/0211296 A1* | 7/2014 | Walls | G02F 1/167 359/296 |
| 2016/0284277 A1 | 9/2016 | Lin et al. | |
| 2018/0216833 A1 | 8/2018 | Baker et al. | |
| 2020/0037474 A1* | 1/2020 | Silha | H02J 7/0013 |
| 2020/0162007 A1 | 5/2020 | Sheeks et al. | |
| 2022/0200303 A1 | 6/2022 | Swamy et al. | |

FOREIGN PATENT DOCUMENTS

| | | |
|---|---|---|
| CN | 202405389 U | 8/2012 |
| CN | 103072334 B | 7/2015 |
| CN | 106113627 A | 11/2016 |
| CN | 104518253 B | 3/2017 |
| CN | 206271767 U | 6/2017 |
| CN | 207416218 U | 5/2018 |
| CN | 108198961 A | 6/2018 |
| CN | 109217397 A | 1/2019 |
| CN | 107317056 B | 8/2019 |
| CN | 110429355 A | 11/2019 |
| CN | 108275019 B | 3/2020 |
| CN | 210403959 U | 4/2020 |
| CN | 108281717 B | 8/2020 |
| DE | 2346115 A1 | 4/1975 |
| DE | 202008003514 U1 | 5/2008 |
| DE | 102011077598 A1 | 12/2012 |
| KR | 101520402 B1 | 5/2015 |
| KR | 101774287 B1 | 9/2017 |

OTHER PUBLICATIONS

Extended European Search Report for Application No. 21878624.2 dated Oct. 24, 2024 (12 pages).
International Search Report and Written Opinion for Application No. PCT/US2021/054193 dated Jan. 27, 2022 (13 pages).

* cited by examiner

STRUCTURE WITH COLOR-CHANGING HOUSING

CROSS-REFERENCE TO RELATED APPLICATIONS

This application claims priority to U.S. Provisional Patent Application No. 63/089,743 filed on Oct. 9, 2020, the entire contents of which are incorporated herein by reference.

FIELD

The present disclosure relates to structures having a housing. More particularly, the present disclosure relates to structures such as a storage container, a battery storage container, a battery, a battery charger, and a power tool.

BACKGROUND

The temperature of a structure can be influenced by the color or absorptivity of the structure's housing, where "color" can be a term used to describe a property possessed by an object of producing different sensations on the eye as a result of the way the object reflects, absorbs, or emits light or another energy. Absorptivity can be a term used to describe a degree to which something absorbs energy, such as light, heat, or the like. For instance, a structure with a black housing may increase the amount of light, such as sunlight, absorbable by the housing, and thus relatively increase the temperature of the structure. Correspondingly, a structure with a white housing may decrease the amount of light absorbable by the housing, and thus relatively decrease the temperature of the structure. Color may influence the absorptivity of an object.

SUMMARY

The present disclosure provides, in one aspect, an electrical device capable of emitting or absorbing energy relative a surrounding environment. The electrical device includes a housing having at least one surface exposed to the surrounding environment, an interior volume defined in the housing, an energy sensor at least partially exposed to the surrounding environment, a first material having a first absorptivity, and a second material having a second absorptivity lower than the first absorptivity. The first material is nearer to the surrounding environment than the second material is at an energy sensor reading below a threshold energy range, and the first material is farther from the surrounding environment than the second material is at an energy sensor reading above the threshold energy range.

The present disclosure provides, in another aspect, an electrical device capable of emitting or absorbing energy relative a surrounding environment. The electrical device includes a fluid media, a plurality of negatively charged pigments suspended in the fluid media and having a first absorptivity, a plurality of positively charged pigments suspended in the fluid media and having a second absorptivity, a first electrode positioned on a first side of the fluid media, a second electrode positioned on a second side of the fluid media, an energy sensor, and a controller selectively supplying opposing charge to the first electrode and the second electrode to directionally move the plurality of negatively and positively charged pigments based on one or more signals provided by the energy sensor.

The present disclosure provides, in yet another aspect, an electrical device capable of emitting or absorbing energy relative a surrounding environment. The electrical device includes an energy mitigating material and a housing including a surface exposed to the surrounding environment. The surface is permeated with the energy mitigating material and reflects or absorbs energy based on a ratio of energy reflectiveness to emissivity. The energy mitigating material effectuates the housing to absorb energy for ratios of energy reflectiveness to emissivity below a threshold amount and effectuates the housing to emit energy for ratios of energy reflectiveness to emissivity above the threshold amount.

Features and aspects of the disclosure will become apparent by consideration of the following detailed description and accompanying drawings.

Before any embodiments of the disclosure are explained in detail, it is to be understood that the disclosure is not limited in its application to the details of embodiment and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
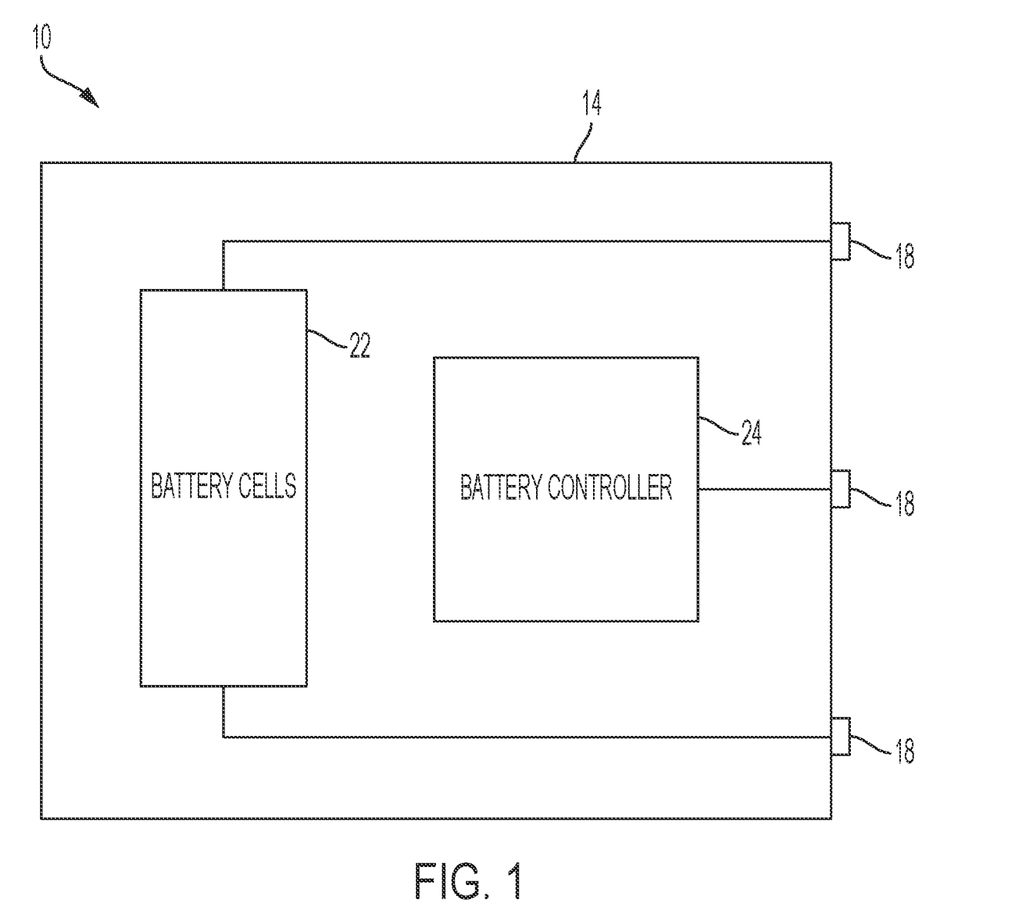
FIG. 1 is a schematic view of a battery.
Figure 2:
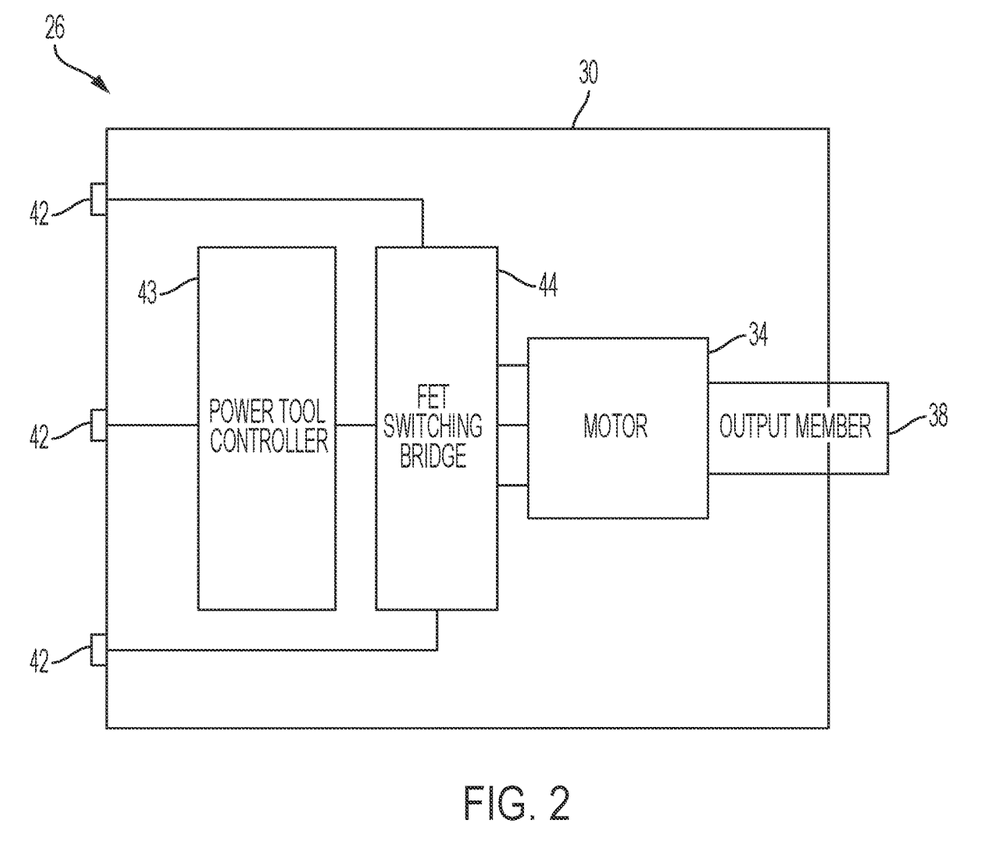
FIG. 2 is a schematic view of a power tool.

FIG. 1 schematically illustrates a battery 10 having a housing 14 and a plurality of terminals 18 on the housing 14 and electrically connected to one or more cells 22 in the housing 14. In some embodiments, the battery 10 is a battery pack configured to power, e.g., a power tool 26 that is schematically illustrated in FIG. 2. The battery 10 includes a battery controller 24. The battery cells 22 may have any suitable chemistry for providing power to a power tool 26. For example, the battery cells 22 may be Lithium-ion (Li-ion), Nickel-Cadmium (Ni-Cad), or other suitable chemistry. The battery controller 24 is, for example, a microprocessor, a microcontroller, and the like and may be implemented as a field programmable gate array (FPGA), an application specific integrated circuit (ASIC), and the like. The plurality of terminals 18 may include a positive power terminal, a negative power terminal, a charging terminal, a low-power terminal, and/or a communication terminal. In some embodiments, the battery 10 may be one of the battery packs described in U.S. patent application Ser. No. 16/751, 344, filed on Feb. 13, 2020, the entire contents of which are hereby incorporated by reference.

With reference to FIG. 2, the power tool 26 includes a housing 30, an electric motor 34 supported by the housing 30, an output member 38 that is driven by the electric motor, and a plurality of terminals 42 on the housing 30. Thus, when the battery 10 is a battery pack for the power tool 26, the terminals 18 of the battery 10 are mated against the terminals 42 of the power tool 26, the battery 10 can supply power to the electric motor 34. In some embodiments, the power tool 26 may include a power tool controller 43 and a field-effect transistor or "FET" switching bridge 44 that are used to control the motor 34 based on user input. The power tool controller 43 may be implemented similar to the battery controller 24. The FET switching bridge 44 includes an H-Bridge or an inverter bridge to provide operating power to the motor 34 based on PWM signals received from the power tool controller 43. The plurality of terminals 42 may include a positive power terminal, a negative power terminal, a low-power terminal, and/or a communication terminal.

Figure 3:
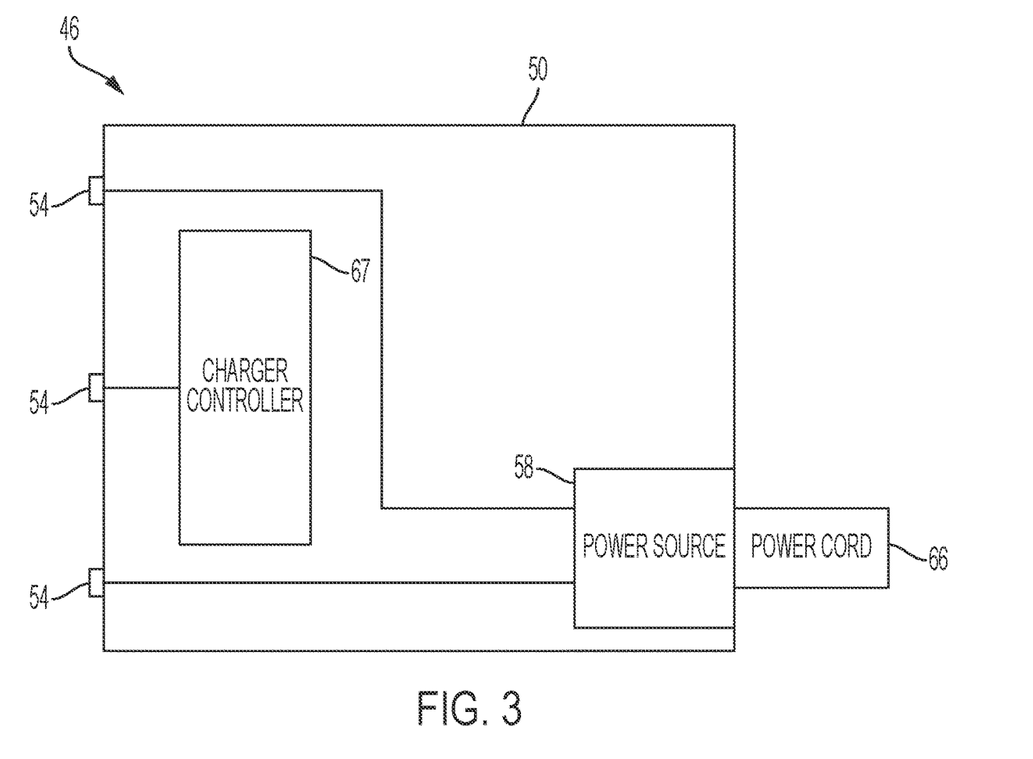
FIG. 3 is a schematic view of a battery charger.

FIG. 3 schematically illustrates a battery charger 46 having a housing 50 and a plurality of terminals 54 on the housing 50 and electrically connected to a power supply 58 in the housing 50. The power supply 58 may be electrically connected to a power cord 66 that is configured to electrically connect to an AC power source, such as a domestic wall socket. In some embodiments, the battery charger 46 is configured to charge the battery 10 when the terminals 18 of the battery 10 are mated against the terminal 54 of the battery charger 46, and the power cord 66 is plugged into a domestic wall socket. In some embodiments, the charger 46 may include a charger controller 67. The plurality of terminals 54 may include a charging terminal, a negative power terminal, and/or a communication terminal. In some embodiments, the battery charger 46 may be one of the battery chargers described in U.S. patent application Ser. No. 16/524,438, filed on Jul. 29, 2019, the entire contents of which are hereby incorporated by reference.

In some embodiments, the charger 46 may incorporate and/or include a portable power supply system, such as the portable power supply described in U.S. Provisional Patent Application No. 63/232,354, filed on Aug. 12, 2021, the entire contents of which are hereby incorporated by reference. Such portable power supply may include one or more of a DC output power conversion unit (e.g., an inverter), an AC output power conversion unit, an input power conversion unit, an internal power source, a corded power tool/corded power supply and/or the like. Such portable power supply may further include one or more ground engaging elements, such as wheels, tracks, and/or the like. In some embodiments, the power supply includes a solar panel. It should be understood that references made below to the capability of the charger 46 also applies to the capability of the portable power supply.

Figure 4A:
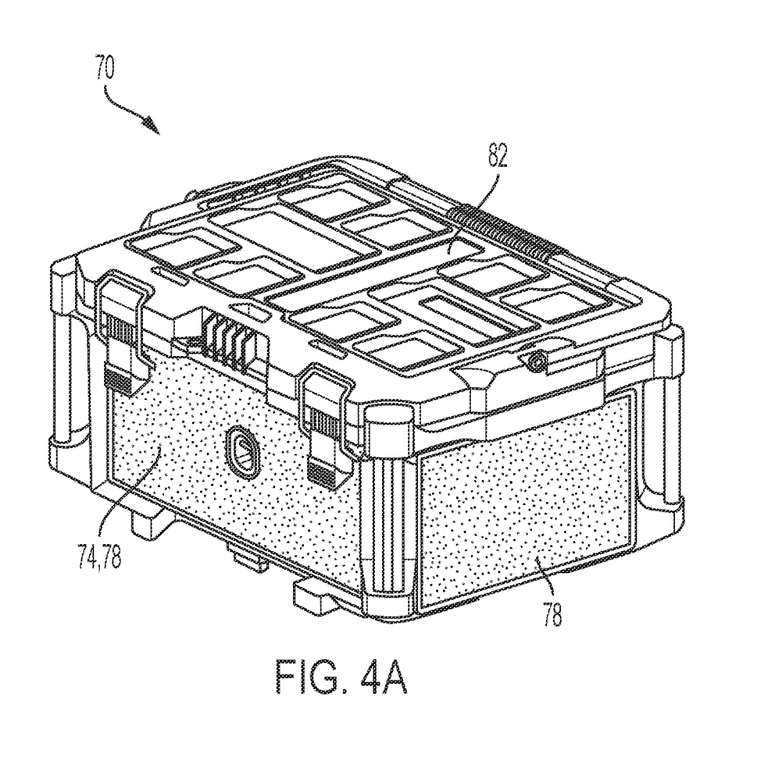
FIG. 4A is a perspective view of a storage container, according to an embodiment disclosed herein, with sides of a housing having a dark color.
Figure 4B:
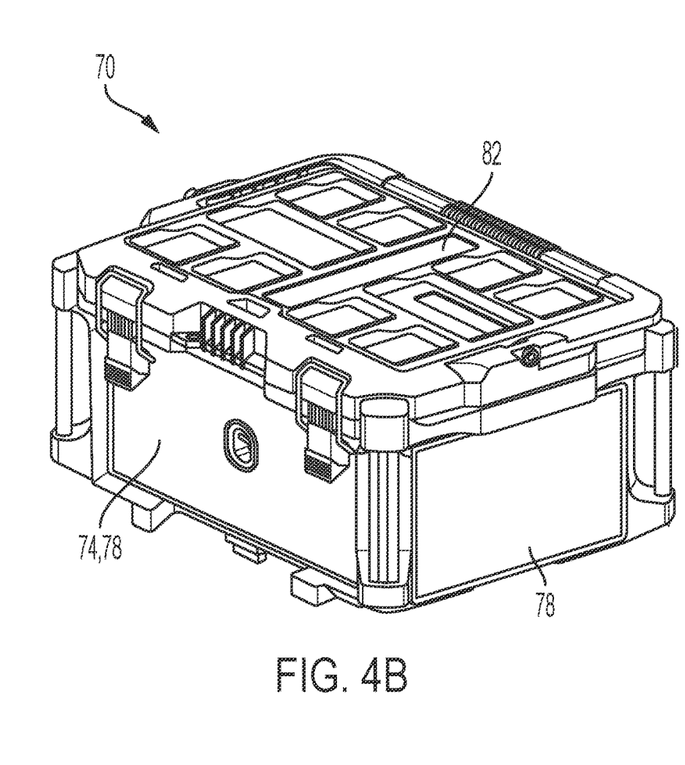
FIG. 4B is a perspective view of the storage container of FIG. 4A with sides of a housing having a light color.

FIGS. 4A and 4B illustrate a first storage container 70 with a housing 74 including a plurality of sides 78. An interior storage volume is defined within the housing 74 and between the sides 78. A lid 82 is coupled to the housing 74 and can be selectively opened and closed to provide access to the interior storage volume, such that objects like batteries or power tools may be stored in the storage volume. In the illustrated embodiment, the lid 82 is opaque.

Figure 5A:
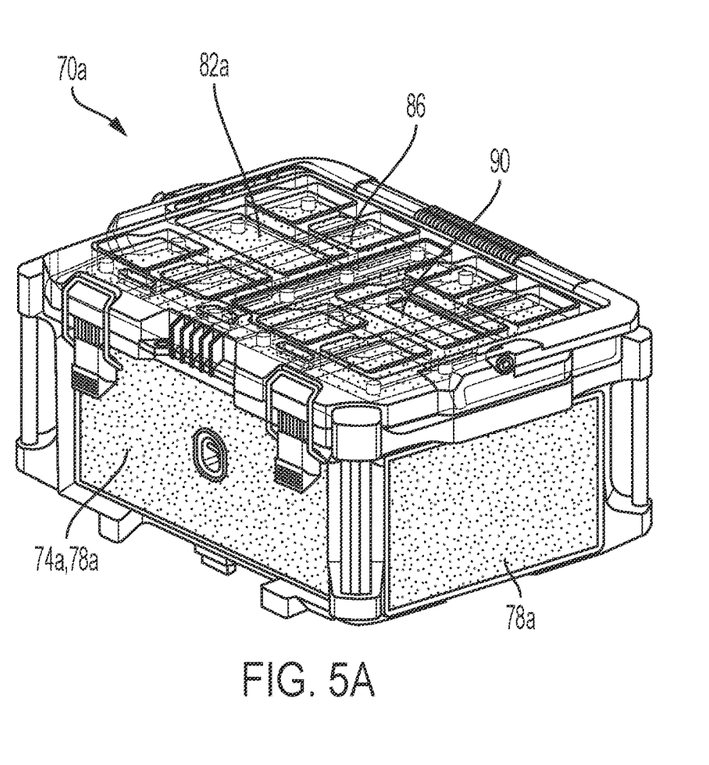
FIG. 5A is a perspective view of a storage container, according to another embodiment disclosed herein, with sides of a housing and an opaque portion of a lid having a dark color.
Figure 5B:
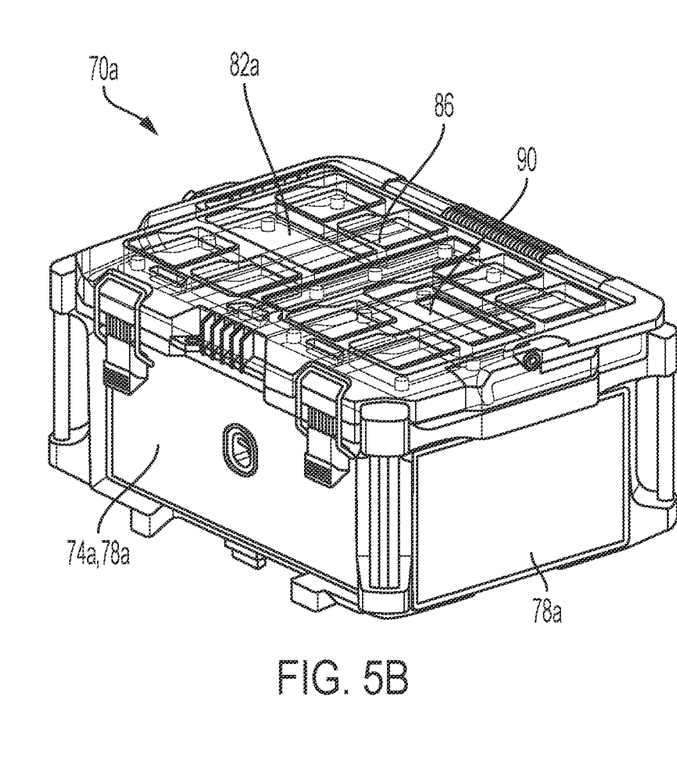
FIG. 5B is a perspective view of the storage container of FIG. 5A with sides of a housing and an opaque portion of a lid having a light color.

FIGS. 5A and 5B illustrate a second storage container 70a that is the same as the storage container 70, with like parts adding a suffix "a" to annotations, except for the differences explained below. Unlike the opaque lid 82 of the first storage container 70, the lid 82a of the second storage container 70a includes a transparent portion 86 and an opaque portion 90 that is closer to the interior storage volume than the transparent portion 86.

The housings 14, 30, 50, 74, 74a and opaque portion 90 described above are all configured to change between a darker color such as black, and a lighter color such as white, based on a change in ambient temperature. The disclosure provides a variety of methods to effectuate such a change in color. In some embodiments, the change in color alters the absorptivity of energy (e.g., light, radiation, and/or heat) of the housings 14, 30, 50, 74, 74a and the opaque portion 90.

Figure 6:
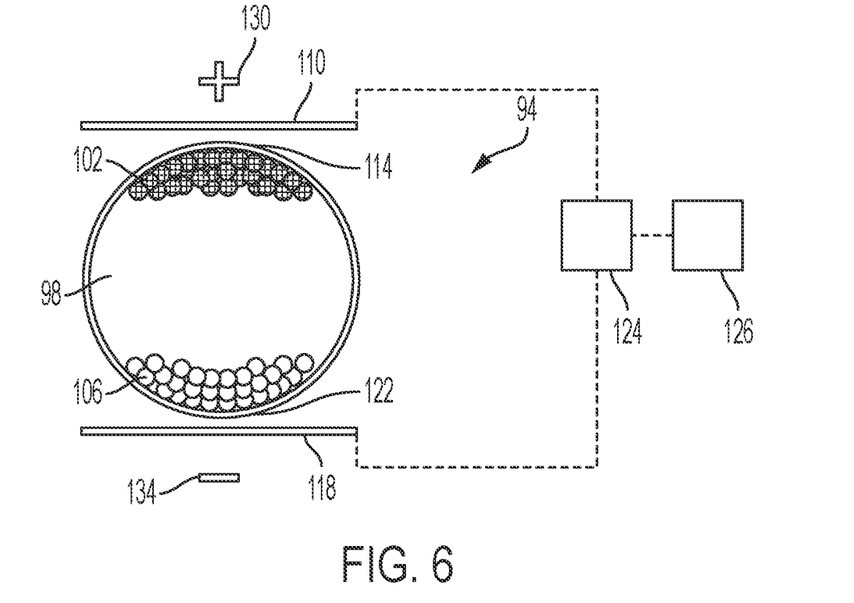
FIG. 6 is a schematic view of an electronic paper display, according to an embodiment disclosed herein, displaying a dark color.
Figure 7:
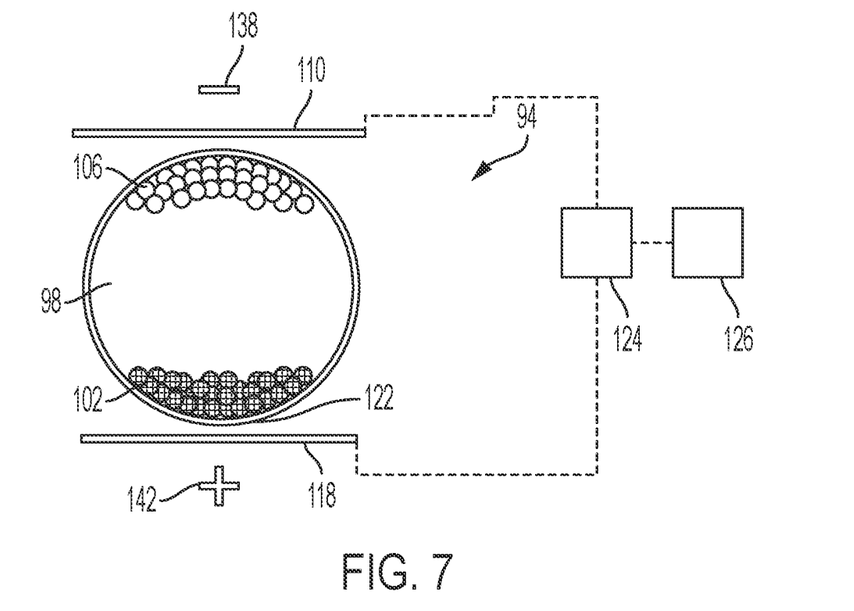
FIG. 7 is a schematic view of the electronic paper display of FIG. 6 displaying a light color.

In some embodiments, the housings 14, 30, 50, 74, 74a and/or opaque portion 90 may include an electronic paper display 94, as schematically illustrated in FIGS. 6 and 7. The display 94 includes a clear fluid media 98 containing a plurality of negatively charged black pigments 102 and a plurality of positively charged white pigments 106. The display 94 includes a first, transparent, outward facing electrode 110 on a first side 114 of the fluid 98, and a second electrode 118 on a second, opposite side 122 of the fluid 98. Each of the first and second electrodes 110, 118 is electrically connected with a controller 124 that is, in turn, in electrical communication with one or more energy sensors such as a temperature sensors 126. As explained below, the display 94 or individual cells thereof change color based on a temperature detected by the one or more temperature sensors 126.

As shown in FIG. 6, in response to the one or more temperature sensors 126 detecting that the ambient temperature is less than a first predetermined threshold temperature, the controller 124 applies a positive charge 130 to the first electrode 110 and a negative charge 134 to the second electrode 118. In response, the positively charged white pigments 106 will be drawn toward the second side 122 and away from the first side 114 of the fluid 98, and the negatively charged black pigments 102 will be drawn toward the first side 114 and away from the second side 122 of the fluid. Thus, the housings 14, 30, 50, 74, 74a and/or opaque portion 90 will have a black color, making it easier for them to absorb light such as sunlight and thereby heat, as the light will be absorbed by the black housings 14, 30, 50, 74, 74a and/or opaque portion 90. Thus, the battery 10, power tool 26, portable power supply, battery charger 46, or first or second storage containers 70, 70a will become relatively warmer, such that the battery 10, power tool 26, battery charger 46, other components (e.g., portable power supply and system), or objects stored in the first and second storage containers 70, 70a are less likely to malfunction, fail to charge, or become damaged in cold ambient temperatures.

As shown in FIG. 7, in response to the one or more temperature sensors 126 detecting that the ambient temperature is above a second predetermined threshold temperature, the controller 124 applies a negative charge 138 to the first electrode 110 and a positive charge 142 to the second electrode 118. In response, the negatively charged black pigments 102 will be drawn toward the second side 122 and away from the first side 114 of the fluid 98, and the positively charged white pigments 106 will be drawn toward the first side 114 and away from the second side 122 of the fluid. Thus, the housings 14, 30, 50, 74, 74a and/or opaque portion 90 will have a white color, making it more difficult for them to absorb light such as sunlight, as the light will be reflected by the white housings 14, 30, 50, 74, 74a and/or opaque portion 90. Thus, the battery 10, power tool 26, portable power supply, battery charger 46, or first or second storage containers 70, 70a will remain relatively cooler, such that the battery 10, power tool 26, battery charger 46, other components (e.g., portable power supply and system), or objects stored in the first and second storage containers 70, 70a are less likely to malfunction, fail to charge, or become damaged in hot ambient temperatures. Advantageously, the display 94 consumes very little electrical power to change the color of the 14, 30, 50, 74, 74a and/or opaque portion 90, from black to white or vice-versa. Also, the display 94 is bi-stable or semi-stable, such that once the color is set, no additional power is needed to hold the color.

Figure 8:
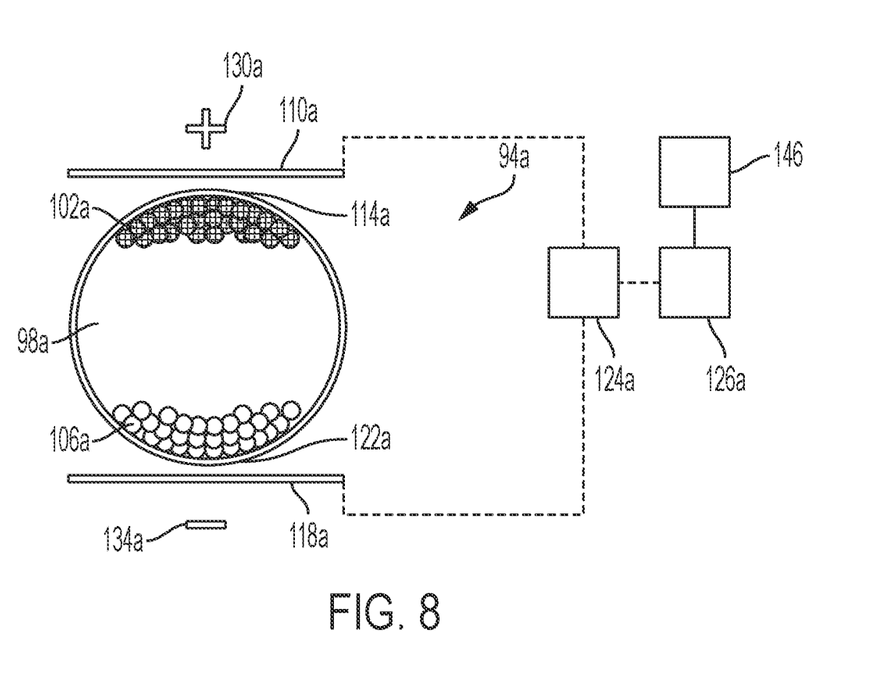
FIG. 8 is a schematic view of an electronic paper display, according to another embodiment disclosed herein, displaying a dark color.
Figure 9:
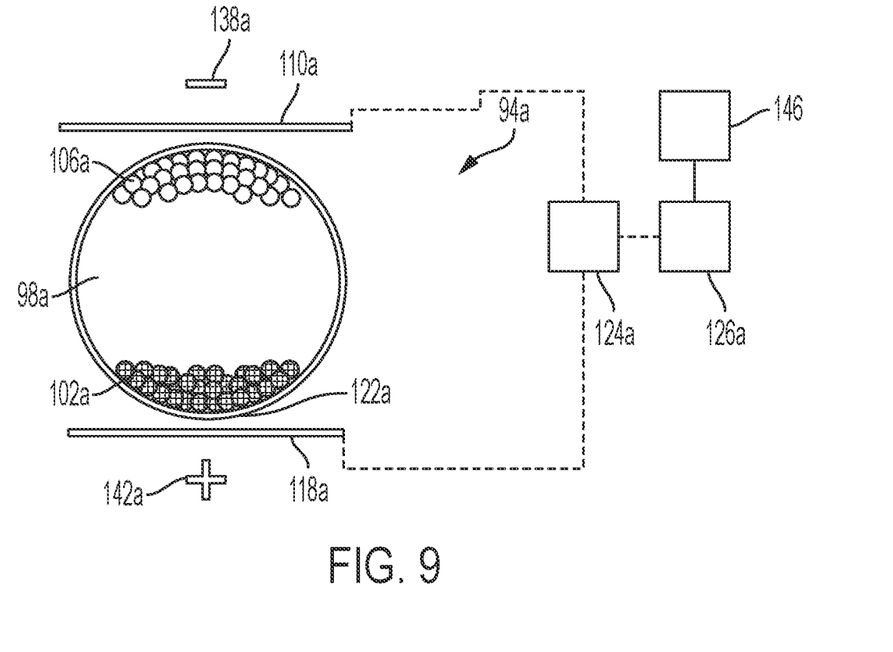
FIG. 9 is a schematic view of the electronic paper display of FIG. 8 displaying a light color.

In some embodiments, the housings 14, 30, 50, 74, 74a and/or opaque portion 90 may include a different embodiment of an electronic paper display 94a, as schematically illustrated in FIGS. 8 and 9. Display 94a is identical to display 94 with like parts adding the suffix "a", except for the differences explained below. In addition to being in electrical communication with the one or more temperature sensors 126a, the controller 124a is in electrical communication with one or more ambient energy sensors such as ambient light sensors 146. As explained below, the display 94a or individual cells thereof change color based on: (1) an ambient light level detected by the one or more ambient light sensors 146; and (2) a temperature detected by the one or more temperature sensors 126a.

As shown in FIG. 8, in response to (1) the one or more ambient light sensors 146 detecting that an ambient light level is above a first predetermined ambient light level, indicative of a lighted or sunlit environment; and (2) the one or more temperature sensors 126a detecting that the ambient temperature is less than a first predetermined threshold temperature, the controller 124a applies a positive charge 130a to the first electrode 110a and a negative charge 134a to the second electrode 118a. In response, the positively charged white pigments 106a will be drawn toward the second side 122a and away from the first side 114a of the fluid 98a, and the negatively charged black pigments 102a will be drawn toward the first side 114a and away from the second side 122a of the fluid. Thus, the housings 14, 30, 50, 74, 74a and/or opaque portion 90 will have a black color, making it easier for them to absorb light such as sunlight and thereby heat, as the light will be absorbed by the black housings 14, 30, 50, 74, 74a and/or opaque portion 90. Thus, the battery 10, power tool 26, portable power supply, battery charger 46, or first or second storage containers 70, 70a will become relatively warmer, such that the battery 10, power tool 26, battery charger 46, other components (e.g., portable power supply and system), or objects stored in the first and second storage containers 70, 70a are less likely to malfunction, fail to charge, or become damaged in environments that: (1) have ambient light or sunlight; and (2) have a relatively cold ambient temperature.

As shown in FIG. 9, in response to (1) the one or more ambient light sensors 146 detecting that an ambient light level is above a first predetermined ambient light level, indicative of a lighted or sunlit environment; and (2) the one or more temperature sensors 126a detecting that the ambient temperature is above a second predetermined threshold temperature, the controller 124a applies a negative charge 138a to the first electrode 110a and a positive charge 142a to the second electrode 118a. In response, the negatively charged black pigments 102a will be drawn toward the second side 122a and away from the first side 114a of the fluid 98a, and the positively charged white pigments 106a will be drawn toward the first side 114a and away from the second side 122a of the fluid. Thus, the housings 14, 30, 50, 74, 74a and/or opaque portion 90 will have a white color, making it more difficult for them to absorb light such as sunlight, as the light will be reflected by the white housings 14, 30, 50, 74, 74a and/or opaque portion 90. Thus, the battery 10, power tool 26, portable power supply, battery charger 46, or first or second storage containers 70, 70a will remain relatively cooler, such that the battery 10, power tool 26, battery charger 46, other components (e.g., portable power supply and system), or objects stored in the first and second storage containers 70, 70a are less likely to malfunction, fail to charge, or become damaged in environments that: (1) have ambient light or sunlight; and (2) have a relatively hot ambient temperature.

Again with reference to FIG. 8, in response to (1) the one or more ambient light sensors 146 detecting that an ambient light level is below a second predetermined ambient light level, indicative of a dark room or dark night; and (2) the one or more temperature sensors 126a detecting that the ambient temperature is above a second predetermined threshold temperature, the controller 124a applies a positive charge 130a to the first electrode 110a and a negative charge 134a to the second electrode 118a. In response, the positively charged white pigments 106a will be drawn toward the second side 122a and away from the first side 114a of the fluid 98a, and the negatively charged black pigments 102a will be drawn toward the first side 114a and away from the second side 122a of the fluid. Thus, the housings 14, 30, 50, 74, 74a and/or opaque portion 90 will have a black color, making it easier for them to emit heat to cool off. Such is common of darker bodies, which emit radiation more readily than light-colored materials. Thus, the battery 10, power tool 26, portable power supply, battery charger 46, or first or second storage containers 70, 70a will remain relatively cooler, such that the battery 10, power tool 26, battery charger 46, other components (e.g., portable power supply and system), or objects stored in the first and second storage containers 70, 70a are less likely to malfunction, fail to charge, or become damaged in environments that: (1) have no or relatively little ambient light; and (2) have a relatively hot ambient temperature.

Again with reference to FIG. 9, in response to (1) the one or more ambient light sensors 146 detecting that an ambient light level is below a second predetermined ambient light level, indicative of a dark room or dark night; and (2) the one or more temperature sensors 126a detecting that the ambient temperature is less than a first predetermined threshold temperature, the controller 124a applies a negative charge 138a to the first electrode 110a and a positive charge 142a to the second electrode 118a. In response, the negatively charged black pigments 102a will be drawn toward the second side 122a and away from the first side 114a of the fluid 98a, and the positively charged white pigments 106a will be drawn toward the first side 114a and away from the second side 122a of the fluid. Thus, the housings 14, 30, 50, 74, 74a and/or opaque portion 90 will have a white color, making it more difficult for them to emit or dissipate heat. Such is common of lighter bodies, which absorb emit radiation less readily than dark-colored materials. Thus, the battery 10, power tool 26, battery charger 46, portable power supply, or first or second storage containers 70, 70*a* will be better suited to retain heat energy, such that the battery 10, power tool 26, battery charger 46, other components (e.g., portable power supply and system), or objects stored in the first and second storage containers 70, 70*a* are less likely to malfunction, fail to charge, or become damaged in environments that: (1) have no or relatively little ambient light; and (2) have a relatively cold ambient temperature.

In some embodiments of the display 94*a* of FIGS. 8 and 9, it is possible that the first predetermined ambient light level is equal to the second predetermined ambient level.

In some embodiments, the housings 14, 30, 50, 74, 74*a* and opaque portion 90 include thermochromic paint or coating having a white or light color when the ambient temperature is at or above the first predetermined threshold temperature. However, the paint changes to a dark or black color when the ambient temperature is below the first predetermined threshold temperature. Thus, the housings 14, 30, 50, 74, 74*a* and/or opaque portion 90 will more readily absorb light such as sunlight and thereby heat, respectively, the battery 10, power tool 26, battery charger 46, portable power supply, or first or second storage containers 70, 70*a*, such that the battery 10, power tool 26, battery charger 46, other components (e.g., portable power supply and system), or objects stored in the first and second storage containers 70, 70*a* are less likely to malfunction, fail to charge, or become damaged in cold ambient temperatures.

In some embodiments, the housings 14, 30, 50, 74, 74*a* and opaque portion 90 include thermochromic paint or coating having a black or dark color when the ambient temperature is at or below the second predetermined threshold temperature. However, the paint changes to a light or white color when the ambient temperature is above the second predetermined threshold temperature. Thus, the housings 14, 30, 50, 74, 74*a* and/or opaque portion 90 will more readily reflect light such as sunlight, such that the battery 10, power tool 26, portable power supply, battery charger 46, or first or second storage containers 70, 70*a* will remain relatively cooler. Thus, the battery 10, power tool 26, battery charger 46, other components (e.g., portable power supply and system), or objects stored in the first and second storage containers 70, 70*a* are less likely to malfunction, fail to charge, or become damaged in hot ambient temperatures.

In some embodiments, the housings 14, 30, 50, 74, 74*a* and opaque portion 90 include ultraviolet (UV)-activated paint, coating, or coloring. The UV-activated paint or coloring is configured to change from light or white to dark or black color when exposed to a UV index that is below the first predetermined threshold temperature. Thus, the housings 14, 30, 50, 74, 74*a* and/or opaque portion 90 will more readily absorb light such as sunlight and thereby heat, respectively, the battery 10, power tool 26, portable power supply, battery charger 46, or first or second storage containers 70, 70*a*, such that the battery 10, power tool 26, battery charger 46, other components (e.g., portable power supply and system), or objects stored in the first and second storage containers 70, 70*a* are less likely to malfunction, fail to charge, or become damaged in cold ambient temperatures.

Alternatively, the UV-activated paint or coloring is configured to change from dark or white to dark or black when exposed to a UV index that is above the second predetermined threshold temperature. Thus, the housings 14, 30, 50, 74, 74*a* and/or opaque portion 90 will more readily reflect light such as sunlight, such that the battery 10, power tool 26, portable power supply, battery charger 46, or first or second storage containers 70, 70*a* will remain relatively cooler. Thus, the battery 10, power tool 26, battery charger 46, other components (e.g., portable power supply and system), or objects stored in the first and second storage containers 70, 70*a* are less likely to malfunction, fail to charge, or become damaged in hot ambient temperatures FIG. 4A illustrates the sides 78 of the housing 74 of the storage container 70 becoming a black or dark color in response to the ambient temperature falling below the first predetermined threshold temperature. FIG. 4B illustrates the sides 78 becoming a light or white color in response to the ambient temperature rising above the second predetermined threshold temperature. Likewise, for storage container 70*a*, FIG. 5A illustrates the sides 78*a* of the housing 74*a* and the opaque portion 90 of the lid 82*a* becoming a black or dark color in response to the ambient temperature falling below the first predetermined threshold temperature. FIG. 5B illustrates the sides 78*a* and the opaque portion 90 of the lid 82*a* becoming a light or white color in response to the ambient temperature rising above the second predetermined threshold temperature.

Figure 10:
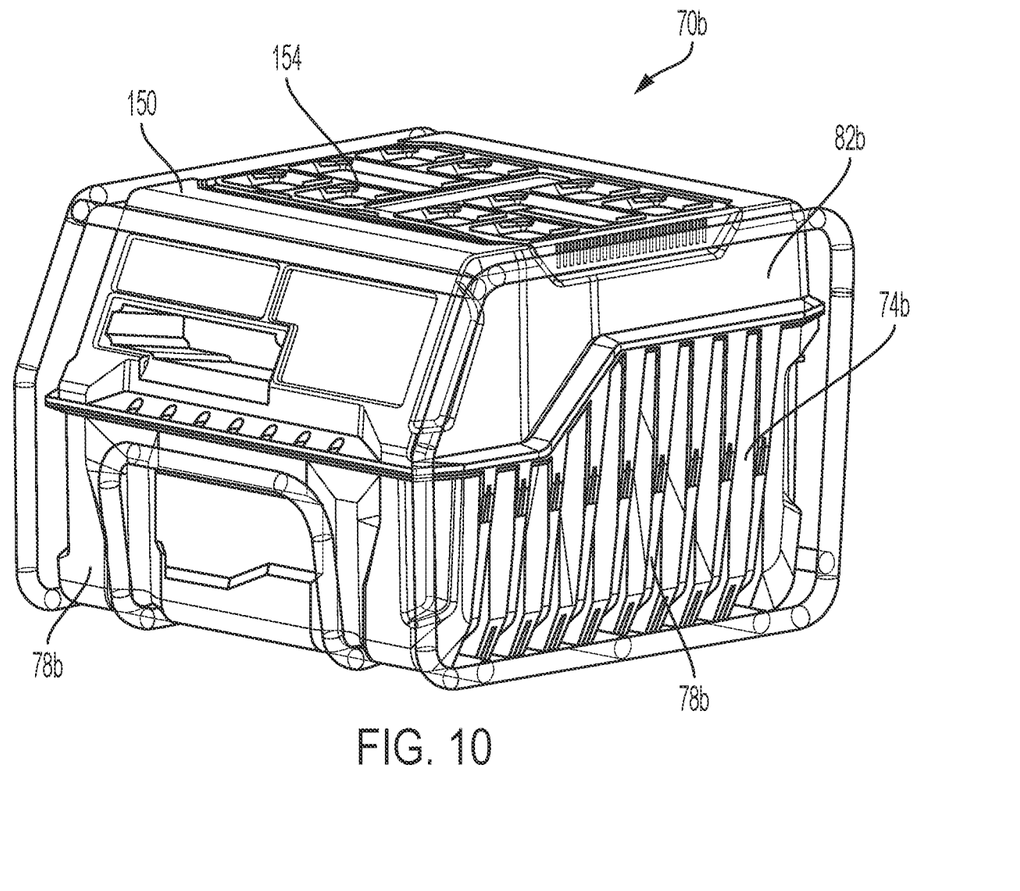
FIG. 10 is a perspective view of a storage container, according to another embodiment disclosed herein, with sides and/or a lid of a housing including a thermal mitigating material.

FIG. 10 illustrates a third storage container 70*b* that is the same as the storage container 70, with like parts adding a suffix "b" to annotations, except for the differences explained below. Similar to the opaque lid 82 of the first storage container 70, the lid 82*b* of the second storage container 70*b* includes an opaque portion 150 and a translucent portion 154 that is inserted/received in the opaque portion 150. In other words, the opaque portion 150 is inlaid with the translucent portion 154. In some embodiments, the translucent portion 154 is interchangeable with a transparent portion.

Rather than being configured to change between a darker color such as black, and a lighter color such as white, as is for the housings 14, 30, 50, 74, 74*a* and opaque portion 90, one or more of the lid 82*b* and the housing 74*b* of the third storage container 70*b* are opaque and at least partially formed of a thermal mitigating material. In the illustrated embodiment, infrared reflective material is added to a material used to form the third container 70*b*. In some embodiments, the first, second, and third storage containers 70, 70*a*, 70*b* include an infrared reflecting coating applied to parts or all of the container lid, housing, or the like.

In one application, the infrared reflective material is a thermal mitigating material applied to a surface or object (e.g., any of the storage containers 70, 70*a*, 70*b*) to alter the emissivity of that surface or object. In the illustrated embodiment, a thermal mitigating coating is applied directly to the third storage container 70*b* to affect a surface reflectiveness (a) to emissivity (c) ratio, expressed as "a/c" herein. The a/c ratio is known in the art as a dimensionless number defined between 0, an ideal reflector (e.g., perfect thermal mirror), and 1, an ideal emitter (e.g., perfect black body). The a/c ratio can thus be specified depending on the coating applied. A similar feature or property is achievable through doping a material (e.g., plastic) with an infrared reflective, or other thermal mitigating, additive.

In some embodiments, an amount and type of thermal mitigating material applied or added to the first, second, or third storage container 70, 70*a*, 70*b* may be measured and integrated therewith such that container 70, 70*a*, 70*b* will absorb or emit heat based on the a/c ratio of the material. Thus, such thermal mitigating material(s) may assist in regulating or maintaining a temperature within the storage container 70, 70*a*, 70*b*. In some embodiments, the containers 70, 70*a*, 70*b* are impregnated or permeated with thermal mitigating material.

Just as the housing 74, 74*a* is configured to become a dark color in response to an ambient temperature falling below a first predetermined threshold temperature and become a light color in response to an ambient temperature rising above a second predetermined threshold temperature, the housing 74b is configured to absorb energy when the a/c ratio is below a first predetermined threshold a/c ratio and configured to emit energy when the a/c ratio is above a first predetermined threshold a/c ratio.

The inclusion of such thermal mitigating material(s), through a coating, doping/additive, or like process, may reduce the likelihood of the battery 10, power tool 26, battery charger 46, other components (e.g., portable power supply and system), or other objects stored in the first, second, or third storage containers 70, 70a, 70b to malfunction, fail to charge, or become damaged in hot or cold ambient temperatures. Similarly, inclusion of such thermal mitigating material(s), through a coating, doping/additive, or like process, may reduce the likelihood the components of the portable power supply system will malfunction, fail, or become damaged in any temperatures.

In any of the embodiments described above, it is possible that the first predetermined temperature is equal to the second predetermined temperature. Similar, in any of the embodiments described above, it is possible that the first predetermined a/c ratio is equal to the second predetermined a/c ratio.

Any of the embodiments described above may also be, in one example application, configured to communicate with the PACKOUT™ stackable storage system, commercialized by the Milwaukee Electric Tool Corporation.

Although not specifically discussed herein with reference to certain preferred embodiments, variations and modifications exist within the scope and spirit of one or more independent aspects of the embodiments as described.

Various features of the disclosure are set forth in the following claims.

What is claimed is:

1. An electrical device capable of emitting or absorbing energy relative a surrounding environment, the electrical device comprising:
   including
      a housing having at least one surface exposed to the surrounding environment;
      an interior volume defined in the housing;
      one or more cells at least partially positioned within the interior volume;
      an energy sensor at least partially exposed to the surrounding environment;
      a first material having a first absorptivity; and
      a second material having a second absorptivity lower than the first absorptivity, wherein
      at an energy sensor reading below a threshold energy range, the first material is nearer to the surrounding environment than the second material is,
      at an energy sensor reading above the threshold energy range, the first material is farther from the surrounding environment than the second material is, and
      an amount of heat energy retained by the one or more cells increases with the first material nearer to the surrounding environment than the second material is.

2. The electrical device of claim 1, wherein the first material and the second material are selectively displayed on the at least one surface exposed to the surrounding environment.

3. The electrical device of claim 1, wherein the first material is darker than the second material.

4. The electrical device of claim 3, wherein the first material is configured to retain heat energy in the interior volume to increase an amount of heat energy therein.

5. The electrical device of claim 4, wherein the second material is configured to emit heat energy from the interior volume to decrease an amount of heat energy therein.

6. The electrical device of claim 1, wherein the amount of heat energy emitted by the one or more cells increases with the second material nearer to the surrounding environment than the first material is.

7. The electrical device of claim 1, wherein the first material is darker than the second material, wherein the first material is configured to emit energy from the interior volume to increase an amount of heat energy dissipated from the interior volume, and wherein the second material is configured to retain energy in the interior volume to decrease an amount of heat energy dissipated from the interior volume.

8. The electrical device of claim 1, further comprising terminals exposed to an exterior of the housing and electrically connected to the one or more cells, the electrical device configured to supply power from the one or more cells to another device electrically coupled to the terminals.

9. An electrical device capable of emitting or absorbing energy relative a surrounding environment, the electrical device comprising:
   including
      a housing having at least one surface exposed to the surrounding environment;
      an interior volume defined in the housing;
      a motor at least partially positioned within the interior volume;
      an energy sensor at least partially exposed to the surrounding environment;
      a first material having a first absorptivity; and
      a second material having a second absorptivity lower than the first absorptivity, wherein
      at an energy sensor reading below a threshold energy range, the first material is nearer to the surrounding environment than the second material is,
      at an energy sensor reading above the threshold energy range, the first material is farther from the surrounding environment than the second material is, and
      an amount of heat energy retained by the motor increases with the first material nearer to the surrounding environment than the second material is.

10. The electrical device of claim 9, wherein the amount of heat energy emitted by the motor increases with the second material nearer to the surrounding environment than the first material is.

11. The electrical device of claim 9, wherein the first material is darker than the second material, wherein the first material is configured to retain heat energy in the interior volume to increase an amount of heat energy therein, and wherein the second material is configured to emit heat energy from the interior volume to decrease an amount of heat energy therein.

12. The electrical device of claim 9, wherein the first material is darker than the second material, wherein the first material is configured to emit energy from the interior volume to increase an amount of heat energy dissipated from the interior volume, and wherein the second material is configured to retain energy in the interior volume to decrease an amount of heat energy dissipated from the interior volume.

13. An electrical device capable of emitting or absorbing energy relative a surrounding environment, the electrical device comprising:
  including
    a housing having at least one surface exposed to the surrounding environment;
    an interior volume defined in the housing;
    charging circuitry at least partially positioned within the interior volume;
    an energy sensor at least partially exposed to the surrounding environment;
    a first material having a first absorptivity; and
    a second material having a second absorptivity lower than the first absorptivity, wherein
    at an energy sensor reading below a threshold energy range, the first material is nearer to the surrounding environment than the second material is,
    at an energy sensor reading above the threshold energy range, the first material is farther from the surrounding environment than the second material is, and
    an amount of heat energy retained by the charging circuitry increases with the first material nearer to the surrounding environment than the second material is.

14. The electrical device of claim 13, wherein the amount of heat energy emitted by the charging circuitry increases with the second material nearer to the surrounding environment than the first material is.

15. The electrical device of claim 13, wherein the first material is darker than the second material, wherein the first material is configured to retain heat energy in the interior volume to increase an amount of heat energy therein, and wherein the second material is configured to emit heat energy from the interior volume to decrease an amount of heat energy therein.

16. The electrical device of claim 13, wherein the first material is darker than the second material, wherein the first material is configured to emit energy from the interior volume to increase an amount of heat energy dissipated from the interior volume, and wherein the second material is configured to retain energy in the interior volume to decrease an amount of heat energy dissipated from the interior volume.

\* \* \* \* \*